Nov. 5, 1957  R. S. HINSEY  2,811,869
MECHANISM CONTROL MEANS AND METHOD OF MAKING SAME
Filed Nov. 15, 1951  2 Sheets-Sheet 1
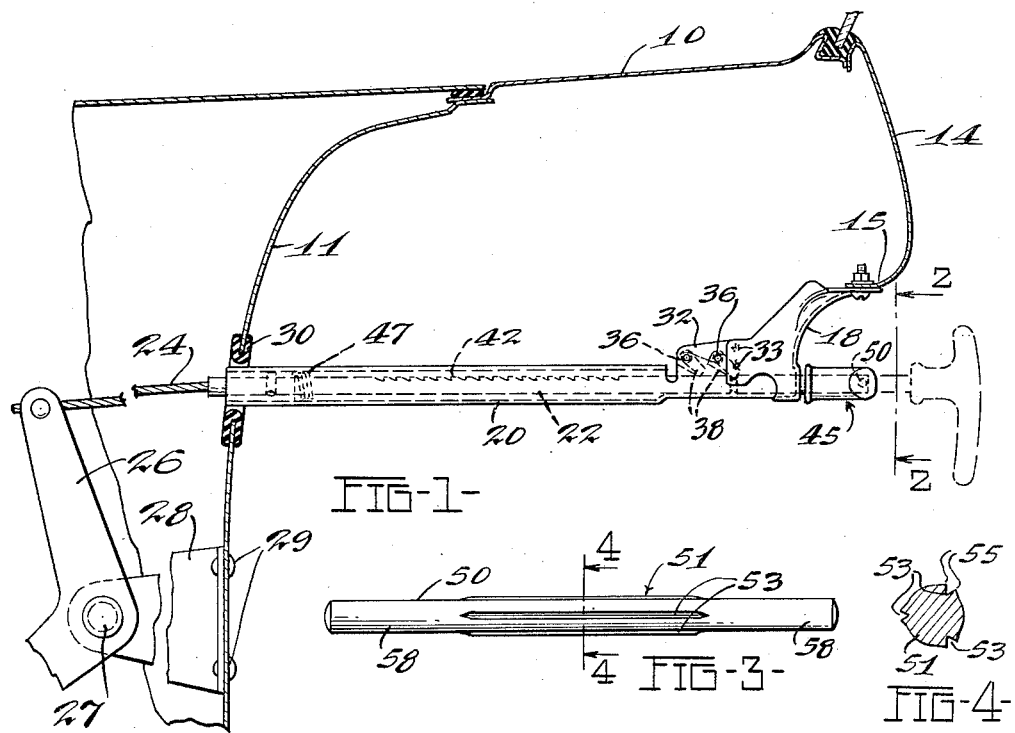
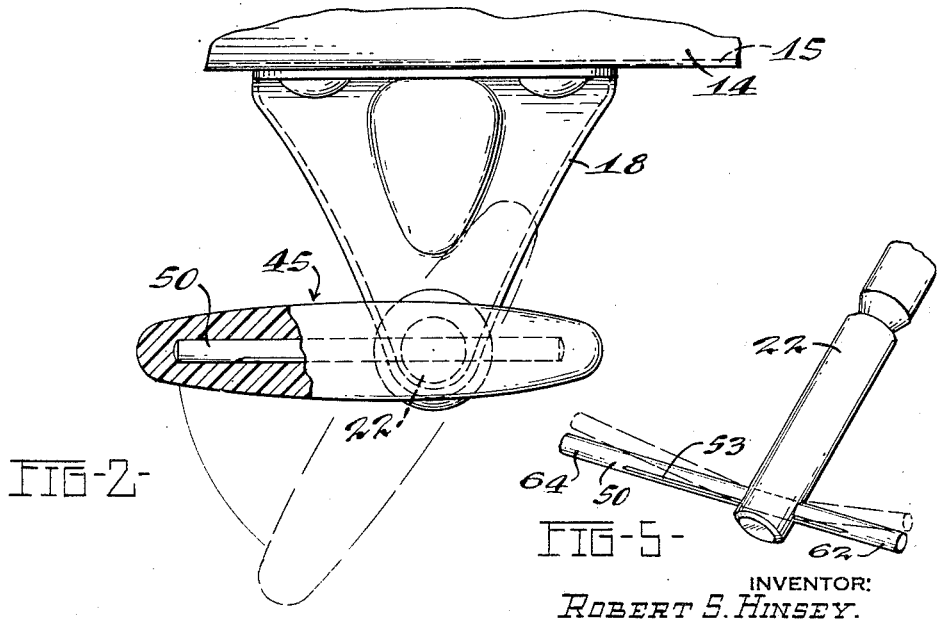
INVENTOR:
ROBERT S. HINSEY.
BY
Harry O. Ernsberger
ATTORNEY Nov. 5, 1957 — R. S. HINSEY — 2,811,869
MECHANISM CONTROL MEANS AND METHOD OF MAKING SAME
Filed Nov. 15, 1951 — 2 Sheets-Sheet 2
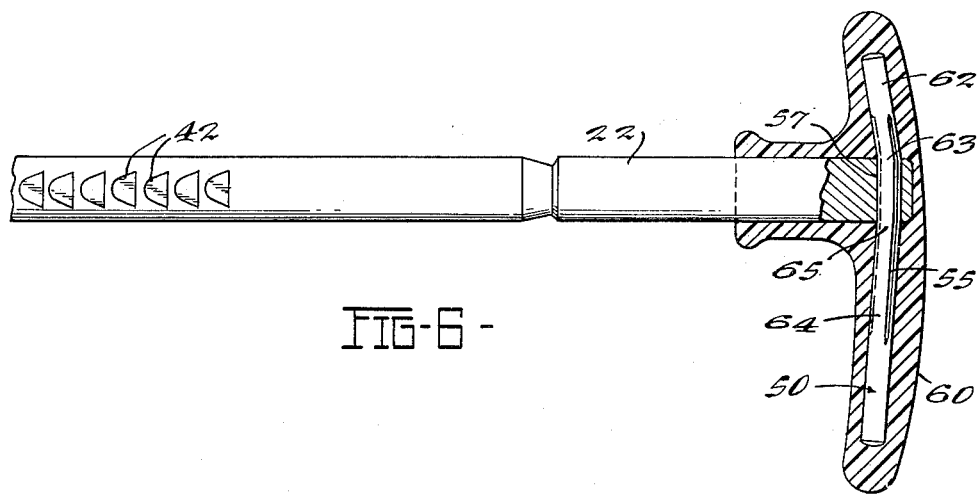
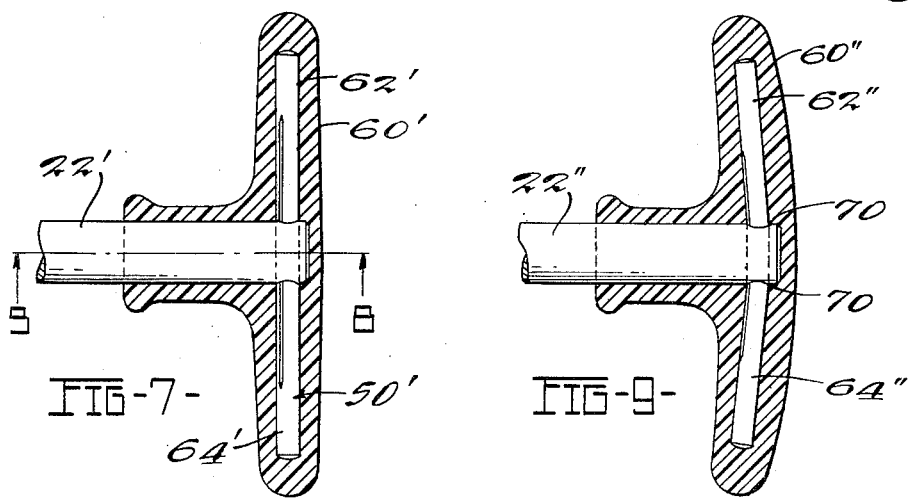
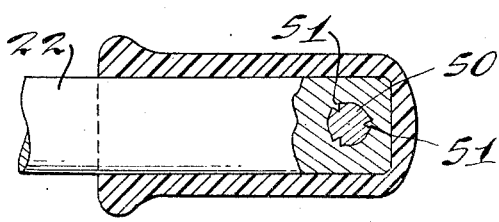
INVENTOR:
ROBERT S. HINSEY.
BY
Harry A. Ernsberger
ATTORNEY

2,811,869

MECHANISM CONTROL MEANS AND METHOD OF MAKING SAME

Robert S. Hinsey, Toledo, Ohio, assignor, by mesne assignments, to The Bingham-Herbrand Corporation, a corporation of Ohio Application November 15, 1951, Serial No. 256,423

2 Claims. (Cl. 74—543)

This invention relates to mechanism actuating or controlling means and more particularly to the construction of a manually operated mechanism control or actuating means and method of making same, the means having particular utility for operating brake mechanisms of a vehicle.

It has become conventional practice to energize or control the emergency or parking brake mechanism of a vehicle by arrangements involving a longitudinally movable or extensible member connected with the brake mechanism in combination with clutch or pawl means adapted to retain the member in an extended position to retain the brake mechanism in a "set" position. Different types of handle or grip means have been devised for the extensible member to facilitate manipulation of the latter.

In one type of construction, a metallic grip member is bored to receive and accommodate the end of the mechanism operating member and is secured thereto by a pin or locking screw. Handle or grip means for a mechanism control member has been fashioned of molded plastic or resin wherein the extremity of a hollow or tubular control member is split longitudinally and the furcations so formed are spead in transverse directions. A resin or plastic material is molded to form a grip portion, the split portions serving to anchor the resin or plastic to the extensible control member. A molded handle or grip construction of this character is shown in Patent No. 2,304,356 issued to C. M. Heller.

This type of construction is difficult to manufacture as it requires several operations to split the control member or bar and bend or configurate the leg portions at the proper angle for their disposition in the molding die. Such construction has not been altogether satisfactory and is expensive to manufacture.

The present invention embraces the provision of a novel handle or grip construction for a mechanism operating member and includes a method of forming the handle or grip construction which is inexpensive to manufacture and which provides an adequate anchor between the handle and the member connected to the brake means or other mechanism to be controlled.

The invention contemplates a mechanism control element and a handle grip portion therefor formed of molded rubber, synthetic rubber, resin or plastic in combination with a reinforcement and anchoring means for establishing a permanent connection between the grip portion and the element.

An object of the invention resides in a novel method of reinforcing and anchoring a molded article to a metallic bar wherein a transverse member is preassembled with the bar in a manner whereby the bar may be adjusted or bent to a desired angle and is imbedded within the molded element whereby grip portions of various shapes and configurations may be molded about the transverse reinforcing member by modifying the position or angularity of the transverse member relative to the bar.

Another object of the invention resides in a method of molding a grip portion or the like of plastic or other material about an end portion of a bar wherein a member extending transversely through the opening in the bar provides a simple yet effective anchor and reinforcing means for the molded material.

Another object of the invention relates to an anchoring means for assuring a permanent connection between a rod and a molded element wherein a pin extends through an opening in the bar and is bent or shaped after its assembly with the bar to a position wherein it becomes a reinforcing core for the molded element and is adapted to be moved transversely relative to the bar or bent to facilitate the formation of different shapes of molded element.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view illustrating a form of parking brake control means for a vehicle including a pull-type brake actuating element;

Figure 2 is an end view as viewed from the line 2—2 in Figure 1;

Figure 3 is an elevational view of the reinforcing and anchor bar for the molded body;

Figure 4 is a sectional view taken substantially on the line 4—4 of Figure 3;

Figure 5 is an isometric view illustrating the assembly of the anchor member with the pull bar;

Figure 6 is a sectional view illustrating the final assembly of the pull bar, the anchor member and the body of molded material;

Figure 7 is a sectional view illustrating a modified position of the anchor member and the molded hand grip portion;

Figure 8 is an enlarged sectional view taken substantially on the line 8—8 of Figure 7, and Figure 9 is a sectional view similar to Figure 7 illustrating a further form of molded hand grip element and anchor member contained therein.

While I have illustrated forms of the invention as especially configurated to be utilized as hand grip members for vehicle brake operating means, it is to be understood that the method of the invention and the structural arrangement may be employed for anchoring molded bodies to metallic elements.

Referring to the drawings in detail, I have illustrated the embodiments of the invention especially usable with mechanism for actuating and releasing the emergency or parking brakes of a vehicle. Numeral 10 indicates a cowl portion of a vehicle, the dashboard 11 and an instrument panel 14, the latter being spaced rearwardly of the dashboard and terminating at its lower portion with a forwardly extending flange 15.

As particularly shown in Figure 1, there is secured to the flange 15 a bracket 18 associated with a tubular member or housing 20 within which is slidably disposed a longitudinally slidable rod or member 22 for actuating and releasing the brake mechanism. The forward extremity of the rod 22 is bored to receive an anchoring means (not shown) for connecting a flexible cable 24 to the rod 22. The cable 24 is connected to the vehicle brake mechanism (not shown) through the medium of a bellcrank lever 26 pivoted upon a pin 27 carried by a bracket 28, the latter being secured to the dashboard 11 or other support by means of rivets 29.

The forward extremity of the tubular housing or casing 20 projects through an opening in the dashboard 11 and is surrounded by a grommet 30 of rubber or other suitable nonmetallic material. The tube or housing 20 at its forward portion is formed with upwardly extending, transversely spaced wall portions 32 which may be welded as at 33 to the bracket 18 or otherwise secured thereto. The upwardly extending walls 32 are provided with spaced openings accommodating pivot pins or pintles 36 upon which are respectively supported clutching means or locking pawls 38. The upper or longitudinally disposed zone of the pull bar 22 is formed with a plurality of teeth or a serrated configuration 42 which is adapted upon rearward slidable movement of the rod 22 to engage and cooperate with the pivotally supported pawls 38 to hold the brake mechanism in a position of "set."

As shown in Figure 1, the serrated portion 42 is aligned with the pawl 38 so that when the bar 22 is moved longitudinally in a righthand direction, as viewed in Figure 1, one of the pawls 38 is in a position to engage a tooth of the serrated portion 42 to prevent retrograde movement of the bar 22. To establish a brake setting or locking condition between the bar 22 and the pawls 38, a hand grip member 45 secured to the bar 22 is grasped by the operator and moved outwardly away from the bracket 18 effecting relative longitudinal slidable movement of the bar 22 without rotating the handle 45.

The bar 22 is provided at its forward end with a transversely extending pin which cooperates with abutments (not shown) formed on the housing 20 for limiting the rotation of the bar 22 to approximately a ninety degree arc. A coil spring 47 is interconnected with the bar 22 and the housing 20 so as to resiliently maintain the bar 22 in a position whereby the serrated zone is adapted for cooperation with the pawls 38. Assuming that the bar 22 has been extended relative to the bracket 18 to brake setting position, disengagement of the pawls 38 with the serrated portion of the bar 22 may be effected by rotating the handle portion 45 in the direction of the arrows indicated in Figure 2 to move the serrated portion or zone 42 out of registration with the pawls 38. This rotation of the bar 22 causes a smooth or cylindrical portion thereof to be brought into registration or longitudinal alignment with the pawls 38 so that the bar may be readily returned or retracted to its initial position as shown in Figure 1.

The present invention is inclusive of a handle or grip portion of novel construction and involves a novel method of formation and assembly of the handle portion with the longitudinally slidable rod 22. One form of the grip member or body 45 is illustrated in Figures 1 and 6. The handle construction involves the incorporation of a reinforcing member or bar imbedded in a moldable material whereby the molded body is permanently and securely held to the bar 22. A reinforcing pin or member forming the core of the molded handle portion is shown in enlarged form in Figures 3 and 4.

The member or pin 50 has a central zone fashioned to a configuration shown at 51 wherein the central zone is swaged or fashioned with longitudinally extending spaced recesses 53, the recesses preferably being formed by impacting or coining as by engaging a suitably shaped tool with the periphery of the pin in a manner causing the material to be forced or distended outwardly providing raised zones or lands 55 as shown in Figure 4. The extremity of the bar 22 is formed with a transverse bore 57 which is of a diameter to slidably accommodate the smooth end portions 58 of the pin, but which forms a drive or close frictional fit with the raised zones or serrated central portion 55 of the pin. The serrated portion of the pin is of a length such that the pin 50 may be centered with respect to the longitudinal axis of the bar 22 as shown in Figures 7 and 9 or offset with respect to the bar 22 as shown in Figure 6.

As illustrated in Figure 6, the pin 50 is driven through the transverse opening 57 in the bar 22 a distance whereby the portion extending from one side of the bar 22 is greater than that extending in the opposite direction. In the form of construction of Figure 6 it is desired to fashion the transverse portion 60 of the molded grip portion in a curved or arcuate direction and to dispose or position the reinforcing pin substantially centrally in the projecting portions of the molded body. The upper projecting portion 62 of the pin is bent in the direction of curvature of the handle portion at zone 63 where it enters the opening in the bar. The longer portion 64 of the pin 50 is likewise bent at the zone 65 in the direction of curvature of the grip portion.

Figure 5 illustrates the bar or rod 22 with the transversely extending pin 50 in its initially assembled position with the bar and prior to the bending of the portions 62 and 64 of the pin to the positions shown in Figure 6 and indicated in broken lines in Figure 5. After the pin 50 has been bent or distorted to the angularity dependent upon the shape of the grip portion desired, the bar with the pin assembled therein and bent to the position shown in broken lines in Figure 5, is inserted in a suitable die or mold of the shape of the grip 45 and the moldable material softened by heat injected into the mold to form the grip portion illustrated in Figures 1, 2 and 6.

Several moldable materials such as semi-hard rubber, synthetic rubber and various thermoplastic and thermosetting plastics or resins have been found to be satisfactory for the grip portion 45. Cellulose acetate butyrate, a thermoplastic, forms an excellent molded grip portion 45. Other thermoplastics that may be used are polymethyl methacrylate, cellulose propionate and materials of this character which have the desirable characteristics of stability at ordinary temperatures in which a vehicle is operated and which are not subject to appreciable "creep." Thermosetting resinous materials such as phenol - formaldehyde, melamine - formaldehyde and urea-formaldehyde may be advantageously employed. Natural rubber of a semi-hard character may be used. Synthetic rubber compositions such as butadiene-acrylonitrile and chlorobutadiene have been found satisfactory. Natural rubber, synthetic rubber or blends thereof may be readily molded to form the grip portion; and in order to present an attractive appearance and give a satisfactory smoothness of grip, they may be coated with other compatible resins or enamels which may be heat set or baked on the molded material.

The projecting portions of the pin 50 form a core for the plastic or molded grip material 60 and provide an ample reinforcement therefor. Due to the characteristics of the process wherein the plastic or other material is molded around the end portion of the pull rod 22 and completely embraces and encloses the pin 50, the result is a permanent grip or handle portion which cannot slip or become loosened relative to the bar 22.

As the intermediate portion of the pin 50 is fashioned with longitudinal ridges or a noncircular cross section of a dimension to frictionally engage the walls of the transverse bore 57 in the bar 22, the oversize dimension of the pin with respect to the bore 57 permits driving or forcing the pin to any and all positions wherein the ridges 53 engage the interior walls of the bore 57 establishing a friction fit of the bar 22 with the rod 22. Figure 8 illustrates the engagement of the ridged zone 51 of the pin 50 with the walls of the bore 57 whereby a snug, secure engagement is assured between the pin 50 and the bar 22.

In the form of handle construction illustrated in Figure 7, the pin 50' is inserted so that the mid or central portion thereof is embraced in the bore formed in the bar 22' with the projecting portions 62' and 64' extending substantially equal distances at either side of the bar 22'. In this form of construction the bar 50' remains in a single rectilinear axis and the plastic or molded portion 60' is of symmetrical configuration transversely of the longitudinal axis of the bar 22'.

Figure 9 illustrates a form of the construction wherein the projecting portions 62" and 64" project substantially equal distances either side of the axis of the bar 22". The projecting portions are bent as shown in the drawing at points 70 to conform to the curvature of the plastic grip portion 60''.

From the foregoing description it will be apparent that the reinforcing member or pin forming the core of the projecting portions of the plastic or molded grip may be disposed in various positions with respect to the pull bar and bent, after assembly with the bar, to various angularities to conform to the shape or shapes desired for the molded grip portion. Through this arrangement, handle or grip portions of various shapes may be fashioned utilizing a single pin as a reinforcing means for the moldable material and an anchor therefor. The pin is fashioned of a metal adapted to be bent to the angularity desired thus rendering the production of several types of handles possible through the utilization of a single form of reinforcing pin.

It is apparent that, within the scope of the invention, modifications and different arrangements may be made other than is herein disclosed, and the present disclosure is illustrative merely, the invention comprehending all variations thereof.

What I claim is:

1. In combination with a brake control mechanism for vehicles including a longitudinally movable brake manipulating member and locking means for retaining said member in brake setting position; said member having a transverse opening formed therein, a pin disposed in the opening and projecting laterally from both sides of said member, said pin having a series of spaced axially extending longitudinal lands engaging the walls of the opening and extending a substantial distance on either side of the opening; a plastic handgrip molded about that portion of said member adjacent the opening and those portions of said pin which project laterally from both sides of said member including those portions of said lands which extend on either side of said opening whereby said lands lock said plastic handgrip and said pin from rotation, said lands being of a length sufficient to permit substantial lateral adjustment of said pin in the opening during assembly of said member and said pins to afford sufficient locking action between said lands and the ends of said handgrip when said handgrip is molded.

2. In combination with a brake control mechanism for vehicles, as in claim 1, and wherein a portion of said pin is angularly disposed with respect to said movable brake member.

References Cited in the file of this patent

UNITED STATES PATENTS

| | | |
|---|---|---|
| 360,426 | Fray et al. | Apr. 5, 1887 |
| 578,180 | Wood | Mar. 2, 1897 |
| 769,033 | Turner | Aug. 30, 1904 |
| 1,355,254 | Parsons | Oct. 12, 1920 |
| 1,365,985 | Gullborg | Jan. 18, 1921 |
| 1,592,204 | Hanson | July 13, 1926 |
| 1,617,557 | Weatherhead, Jr. | Feb. 15, 1927 |
| 1,791,798 | Coen | Feb. 10, 1931 |
| 1,813,797 | Foley | July 7, 1931 |
| 2,061,811 | Sinko | Nov. 24, 1936 |
| 2,133,010 | Barry | Oct. 11, 1938 |
| 2,304,356 | Heller | Dec. 8, 1942 |
| 2,351,181 | Bangasser | June 13, 1944 |
| 2,367,115 | Goepfrich | Jan. 9, 1945 |
| 2,429,224 | Fergueson et al. | Oct. 21, 1947 |
| 2,496,700 | Cole | Feb. 7, 1950 |
| 2,640,618 | Hale, Jr. | June 2, 1953 |

FOREIGN PATENTS

| | | |
|---|---|---|
| 420,084 | Italy | Apr. 16, 1947 |